Patented Aug. 15, 1944

2,356,061

UNITED STATES PATENT OFFICE 2,356,061

ANTHRAQUINONE DYESTUFFS

Francis Irving and Henry Alfred Piggott, Blackley, Manchester, England, assignors to Imperial Chemical Industries Limited, a corporation of Great Britain No Drawing. Application January 5, 1943, Serial No. 471,368. In Great Britain February 2, 1942

3 Claims. (Cl. 260—372)

The present invention relates to the manufacture of new vat dyestuffs of the anthraquinone series. More particularly this invention relates to making vat dyestuffs which are 1:4-dibenzoylaminoanthraquinones in which at least one of the benzoyl nuclei carries a phenylalkanesulphonyl group.

It has been proposed to obtain dyestuffs, which yield on cotton bright scarlet to red dyeings, by introducing into the 1- and 4-positions of the anthraquinone molecule two aroylamino groups, at least one being a m-alkane-sulphonylbenzoylamino group.

Also in our copending application No. 443,650 it has been proposed to manufacture new anthraquinone vat dyestuffs with similar excellent properties to those of the prior proposal, but with a superior colour value, by introducing into the 1- and 4-positions of the anthraquinone molecule two aroylamino groups, at least one being a p-alkanesulphonylbenzoylamino group, in which the alkane group has not more than 4 carbon atoms and may be normal or iso.

We have now found that new anthraquinone dyestuffs of very good fastness properties and particularly resistant to kier-boiling, are obtained by introducing into anthraquinone or into 1-benzoylaminoanthraquinone, phenylalkanesulphonylbenzoylamino groupings.

According to the invention 1-phenylalkanesulphonylbenzoylamino - 4 - benzoylamino - anthraquinones are manufactured by introducing into 1-benzoylaminoanthraquinone, in the manner hereinbelow described, phenylalkanesulphonylbenzoylamino groups wherein the phenyl residue may carry as substituents alkoxyl, alkyl or halogen. These compounds have the general formula:

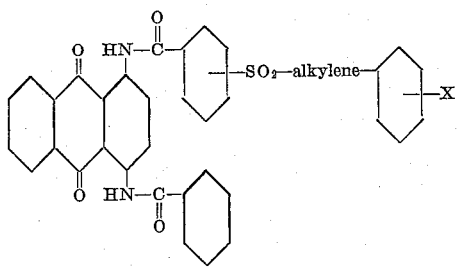

wherein alkylene stands for an alkylene radical which contains from 1 to 3 carbon atoms and X stands for a substituent of the group consisting of —H, —Cl, —CH₃, and —OCH₃.

The introduction of the said phenylalkanesulphonylbenzoylamino groups may be effected by causing the corresponding benzoyl halide or (in the presence of hydrogen chloride) benzamide to react with the necessary amino-substituted anthraquinone or the said benzamide with the necessary halogen-substituted anthraquinone. If only one phenylalkanesulphonyl group is desired, 1-amino-4-benzoylaminoanthraquinone can be reacylated with one molecular proportion of the required phenylalkanesulphonylbenzoyl chloride. Alternatively 1-halogeno-4-benzoylaminoanthraquinone may be caused to react with one molecular proportion of the phenylalkanesulphonylbenzamide. The latter may also be made to interact in the presence of hydrogen chloride with 1-amino-4-benzoylaminoanthraquinone.

It is proposed to introduce those phenylalkanesulphonylbenzoylamino groups in which the alkane group contains from 1 to 3 carbon atoms. Suitable phenylalkanesulphonylbenzoylhalides or phenylalkanesulphonylbenzamides which may be used are for example those obtainable from the following phenylalkanesulphonylbenzoic acids:

p-Phenylmethanesulphonylbenzoic acid, M. P. 267° C. (from p-sulphinobenzoic acid and benzyl chloride)

m-Phenylmethanesulphonyl benzoic acid, M. P. 217° C. (from m-sulphinobenzoic acid and benzyl chloride)

4 - (o - chlorophenylmethanesulphonyl) benzoic acid, M. P. 254° C. (from p-sulphinobenzoic acid and o-chlorobenzyl chloride)

4-(p-tolylmethanesulphonyl) benzoic acid, M. P. 230° C. (from p-sulphinobenzoic acid and p-methylbenzyl chloride)

4 - (p - methoxyphenylmethanesulphonyl (benzoic acid M. P. 249° C. (from p-sulphinobenzoic acid and p-methoxybenzyl chloride)

4-(β-phenylethanesulphonyl) benzoic acid, M. P. 239° C. (from p-sulphinobenzoic acid and β-phenylethyl bromide)

4-(γ-phenylpropanesulphonyl) benzoic acid, M. P. 201° C. (from p-sulphinobenzoic acid and γ-phenylpropyl bromide)

4-(α-phenylethanesulphonyl) benzoic acid, M. P. 224° C. (from sodium p-toluene sulphinate and α-phenylethyl bromide, by oxidising with potassium permanganate under neutral conditions the p-tolyl-α-phenylethyl sulphone so formed).

The p-sulphinobenzoic acid used in the preparation of the above phenylalkanesulphonylbenzoic acids may be prepared from p-chlorosulphonylbenzoic acid as described in J. C. S., 1922, 121, 2024.

The vat dyestuffs of the present invention dye cotton in bright bluish red to scarlet shades.

The following examples in which parts are by weight illustrate but do not limit the invention.

*Example 1*

9 parts of p-phenylmethanesulphonylbenzoic acid are converted to the acid chloride by heating with 150 parts of nitrobenzene and 7 parts of thionyl chloride at 100° C. with stirring under a reflux condenser until solution is complete. The excess of thionyl chloride is removed by distillation at 150° C.

To the nitrobenzene solution of acid chloride obtained as described above are added 10 parts of 1 - amino - 4 - benzoyl - amino-anthraquinone. The mixture is boiled for 1½ hours under a reflux condenser. After cooling, the separated material is filtered off, washed with nitrobenzene and then freed from nitrobenzene by boiling with water in a current of steam. The so-obtained dyestuff dyes cotton from a bluish-grey alkaline hydrosulphite vat in bright bluish red shades having excellent fastness properties. The dyestuff is soluble in concentrated sulphuric acid, yielding a red solution.

The same dyestuff is obtained by interaction of p-phenylmethanesulphonylbenzamide, M. P. 275° C., with 1-amino-4-benzoylamino-anthraquinone in the presence of hydrogen chloride, and it is also obtained by condensation of p-phenylmethanesulphonylbenzamide with 1-chloro-4-benzoylamino-anthraquinone in the presence of nitrobenzene, an acid-binding agent and a copper catalyst.

*Example 2*

9 parts of m-phenylmethanesulphonylbenzoic acid are converted to the acid chloride and then caused to interact with 10 parts of 1-amino-4-benzoylaminoanthraquinone as in Example 1.

The resulting dyestuff dyes cotton in red shades, somewhat yellower than those given by the product of Example 1 and having excellent fastness properties.

*Example 3*

10 parts of 4 - (α - chlorophenylmethanesulphonyl) benzoic acid are converted to the corresponding acid chloride and then reacted with 10 parts of 1-amino-4-benzoylamino-anthraquinone in the manner described in Example 1. The resulting dyestuff dyes cotton in scarlet shades having excellent fastness properties.

We claim:

1. The compounds of the formula:

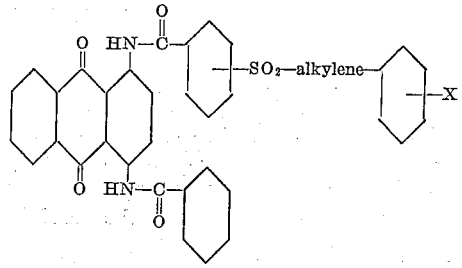

wherein alkylene stands for an alkylene radical which contains from 1 to 3 carbon atoms and X stands for a substituent of the group consisting of —H, —Cl, —CH₃, and —OCH₃.

2. 1 - phenylalkanesulphonylbenzoylamino - 4 - benzoylaminoanthraquinones.

3. 1 - phenylmethanesulphonylbenzoylamino-4-benzoylaminoanthraquinone.

FRANCIS IRVING.
HENRY ALFRED PIGGOTT.